(12) United States Patent
Schinazi et al.

(10) Patent No.: US 7,987,631 B2
(45) Date of Patent: Aug. 2, 2011

(54) INSECT LURE TRAP WITH FLOW RESTRICTOR

(75) Inventors: Alan Schinazi, Providence, RI (US); David Zitnick, Providence, RI (US); Hamid Pishdadian, Warwick, RI (US); Michael C. Vieira, Fall River, MA (US)

(73) Assignee: Woodstream Corporation, Lititz, PA (US)

( * ) Notice: Subject to any disclaimer, the term of this patent is extended or adjusted under 35 U.S.C. 154(b) by 389 days.

(21) Appl. No.: 12/059,912

(22) Filed: Mar. 31, 2008

(65) Prior Publication Data
US 2008/0244959 A1 Oct. 9, 2008

Related U.S. Application Data

(60) Provisional application No. 60/909,405, filed on Mar. 30, 2007.

(51) Int. Cl.
A01M 1/06 (2006.01)
A01M 1/02 (2006.01)
A01M 1/10 (2006.01)

(52) U.S. Cl. .......................................... 43/139; 43/107

(58) Field of Classification Search ................... 43/139, 43/107, 113, 112
See application file for complete search history.

(56) References Cited

U.S. PATENT DOCUMENTS

| | | | |
|---|---|---|---|
| 662,489 A | 11/1900 | Fulton | |
| 1,671,404 A | 5/1928 | Cherry | |
| 1,693,368 A | 11/1928 | Cherry | |
| 1,807,550 A | 5/1930 | Rector | |
| 2,806,321 A | 5/1956 | Blackman | |
| 2,893,161 A | 7/1959 | Reid | |
| 3,196,577 A | 7/1965 | Plunkett | |
| 3,557,818 A * | 1/1971 | Rohde | 137/505.42 |
| 4,384,792 A * | 5/1983 | Sommers et al. | 374/36 |
| 4,519,776 A * | 5/1985 | DeYoreo et al. | 43/107 |
| 4,785,573 A | 11/1988 | Millard | |
| 4,915,127 A * | 4/1990 | Werley | 137/505.42 |
| 5,157,865 A | 10/1992 | Chang | |
| 5,205,064 A | 4/1993 | Nolen | |
| 5,205,065 A | 4/1993 | Wilson et al. | |
| 5,241,779 A | 9/1993 | Lee | |
| 5,255,468 A | 10/1993 | Cheshire, Jr. | |
| 5,301,458 A | 4/1994 | Deyoreo et al. | |
| 5,417,009 A | 5/1995 | Butler et al. | |
| 5,456,282 A * | 10/1995 | Whitehead et al. | 137/505.13 |
| 5,647,164 A | 7/1997 | Yates | |
| 5,669,176 A | 9/1997 | Miller | |
| 6,062,258 A * | 5/2000 | Diehl | 137/505.41 |
| 6,145,243 A * | 11/2000 | Wigton et al. | 43/139 |
| 6,263,908 B1 * | 7/2001 | Love et al. | 137/489 |
| 6,286,249 B1 | 9/2001 | Miller et al. | |
| D466,579 S | 12/2002 | Spiro et al. | |
| 6,594,946 B2 * | 7/2003 | Nolen et al. | 43/107 |
| 6,655,078 B2 * | 12/2003 | Winner et al. | 43/107 |
| 6,655,080 B2 * | 12/2003 | Spiro et al. | 43/139 |
| 6,662,489 B2 * | 12/2003 | Spiro et al. | 43/107 |
| 6,817,140 B1 * | 11/2004 | Durand et al. | 43/139 |

(Continued)

*Primary Examiner* — Darren W Ark
(74) *Attorney, Agent, or Firm* — Jacobson Holman PLLC

(57) ABSTRACT

A flow restrictor is provided to reduce pressure in the flow of a fluid, such as a hydrocarbon-based fuel. The flow restrictor takes the form of a capillary that is void of any abrupt flow disruptions. The flow restrictor may be used in place of an orifice and provides the advantage that it has a larger diameter than an orifice of similar function. Precipitation is less likely to form on the restrictor and any precipitation is less likely to have an adverse affect on performance.

7 Claims, 4 Drawing Sheets

U.S. PATENT DOCUMENTS

| | | | |
|---|---|---|---|
| 6,840,005 B2 * | 1/2005 | Durand et al. | 43/139 |
| 6,892,492 B2 | 5/2005 | Durand et al. | |
| 6,925,752 B1 * | 8/2005 | Cherry et al. | 43/139 |
| 7,074,830 B2 | 7/2006 | Durand et al. | |
| 7,181,885 B2 * | 2/2007 | Spiro et al. | 43/139 |
| 7,243,458 B2 | 7/2007 | Miller et al. | |
| 7,281,351 B2 * | 10/2007 | Durand et al. | 43/139 |
| 7,293,388 B2 * | 11/2007 | DeYoreo et al. | 43/139 |
| 7,302,938 B2 * | 12/2007 | Yu et al. | 123/514 |
| 7,614,180 B2 * | 11/2009 | Durand et al. | 43/139 |
| 2003/0154643 A1 | 8/2003 | Spiro et al. | |
| 2003/0208951 A1 | 11/2003 | Bossler | |
| 2005/0066570 A1 * | 3/2005 | Mosher et al. | 43/139 |
| 2005/0210737 A1 | 9/2005 | Durand et al. | |
| 2007/0043335 A1 | 2/2007 | Olsen et al. | |
| 2010/0037512 A1 * | 2/2010 | Durand | 43/139 |
| 2010/0132248 A1 * | 6/2010 | Durand et al. | 43/139 |

* cited by examiner

INSECT LURE TRAP WITH FLOW RESTRICTOR

This application claims the benefit of U.S. Provisional Application 60/909,405, filed Mar. 30, 2007, the entire disclosure of which is incorporated by reference.

FIELD OF THE INVENTION

The present invention generally relates to a flow restrictor, and specifically relates to a flow restrictor that does not include abrupt flow disruptions and may be used with hydrocarbon-based gases.

BACKGROUND OF THE INVENTION

Flow restrictors, used for reducing pressure and regulating flow, are used in a vast number of different applications. For instance, $CO_2$ insect traps, which produce $CO_2$ from air and a combustible fuel, typically use two flow restrictors. A diaphragm regulator is first used to reduce the pressure of the combustible fuel from approximately 120 psi down to 11 in $H_2O$ (0.4 psi). However, such insect traps are very low pressure devices and require further pressure reduction. A second flow restrictor is used because the diaphragm regulator has poor reliability at pressures much below 11 in $H_2O$. In order to further reduce the pressure, a fixed orifice may be used. When operating properly, the fixed orifice provides a very inexpensive means to accurately regulate pressure of the combustible fuel.

However, it is possible that precipitation will form on the orifice where there is a change in the pressure. The likelihood of precipitation is magnified by the abrupt disruption in the flow. Many orifices used for precise pressure drop applications are very small. They may be 10-thousandths of an inch or smaller. Due to the size of the orifice, even very small quantities of precipitate thereon can negatively impact the performance of the device. Further, if too much precipitate accumulates, the orifice can be blocked entirely, and the device may not operate. In the case of a $CO_2$ insect trap, even relatively small changes in the overall flow rate can negatively impact performance of the device, by impacting the stochiometry of the reaction.

Thus, there is a need for a flow restrictor in such applications that effectively reduces fluid pressure without abrupt disruptions in the flow and without relying on a very small diameter orifice.

SUMMARY OF THE INVENTION

The present invention provides a flow restrictor for reducing the pressure of a fluid as it flows through a device. The flow restrictor is suitable for use with hydrocarbon based fluids, such as propane or petroleum gas. In one embodiment, the flow restrictor is in the form of an elongated capillary tube.

The flow restrictor may be used in an inventive $CO_2$ insect trap utilizing the advantages of the restrictor. The $CO_2$ insect trap includes a suction device, such as a blower or fan, for pulling intake air into the trap. The intake air carries insects, for example mosquitoes, along with it into the trap. A catch included in the trap catches the insects preventing them from escaping. The catch can take various forms. For instance, it may be a rigid container with screen mesh, webbing or small holes, or it can be a net bag.

The trap can also include a device to kill the insects once they are caught. Alternatively, the insects may simply be detained indefinitely, or can be let go once they are no longer a nuisance. The trap also emits $CO_2$ in order to lure insects close enough that they are sucked in by the intake air. The $CO_2$ is produced from a combustible fluid in a catalytic reactor. The combustible fluid is mixed with at least a portion of the intake air and the mixture is oxidized on the catalyst to produce $CO_2$ and $H_2O$. The reaction products are emitted from the trap in order to lure insects. The $CO_2$ can be mixed with some of the incoming air after it has been produced to help carry it away from the trap. The rest of the intake air is expelled as waste air.

The combustible fluid is held at high pressure, in liquefied form, in a cylinder adjacent the trap. The pressure of the combustible fluid is reduced using a two stage pressure reduction scheme. First, the pressure is dropped from high pressure to a more moderate pressure using a regulator, such as a diaphragm regulator. The pressure is then dropped again using the inventive flow restrictor.

In one embodiment, the flow restrictor is in the form of a long capillary that gradually reduces the pressure of the fluid. The head loss is caused by shear and frictional losses in the capillary. The length of the capillary provides that no abrupt disruptions in the flow are required to decrease the pressure. Instead, the pressure is gradually reduced over the length of the capillary. Thus, it is less likely that condensation is formed at a single point within the restrictor. Further, the length also provides a sufficient decrease in pressure without requiring a very narrow diameter opening. Thus, any condensation that forms is less likely to have adverse affects on the performance of the restrictor because it will obstruct a smaller fraction of the opening and is unlikely to block the opening.

The required length of the passage may be reduced by introducing a gradual and continuous change in direction to the fluid, increasing the pressure drop per unit length.

BRIEF DESCRIPTION OF THE DRAWINGS

These and other objects and features of the invention will become more apparent by referring to the drawings, in which.

DETAILED DESCRIPTION

Figure 1:
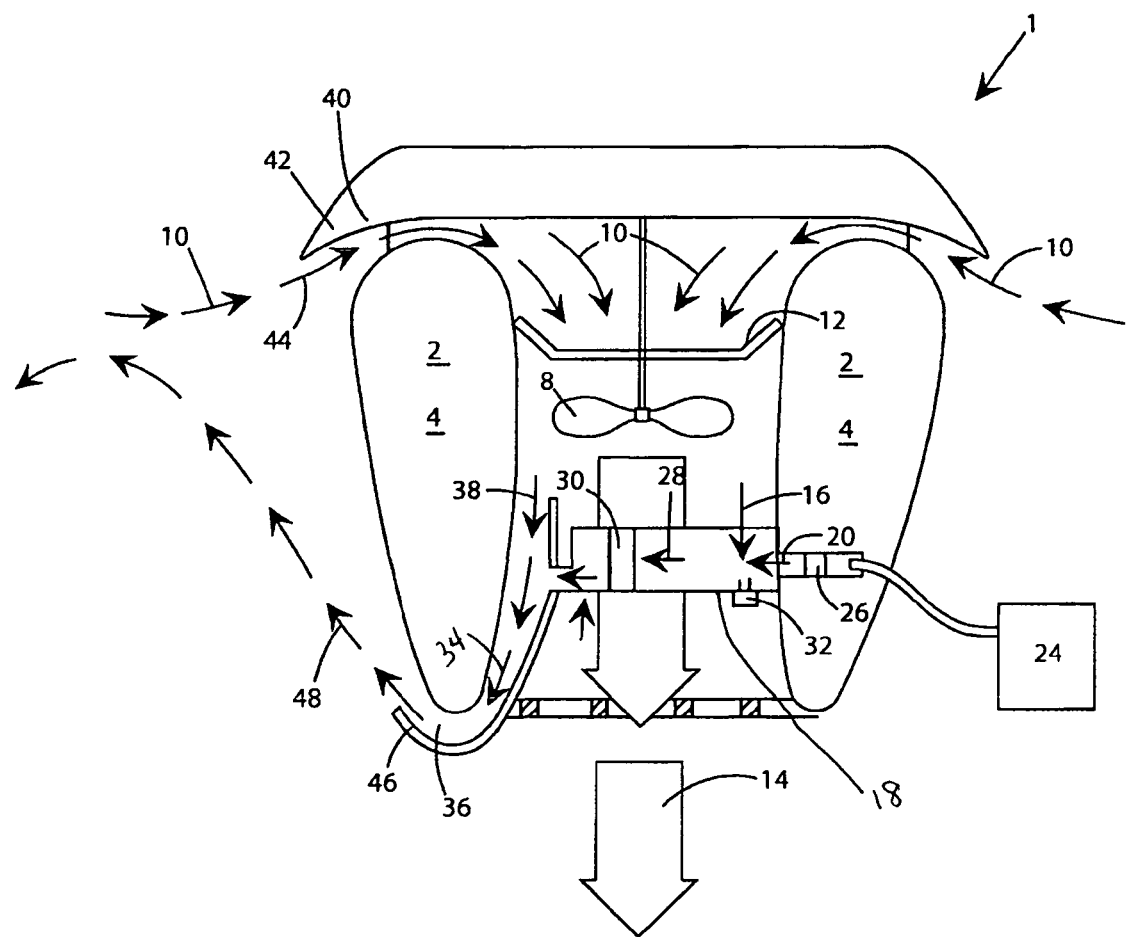
FIG. 1 is a cross sectional view of a $CO_2$ trap including an embodiment of a flow restrictor according to the present invention.
Figure 2:
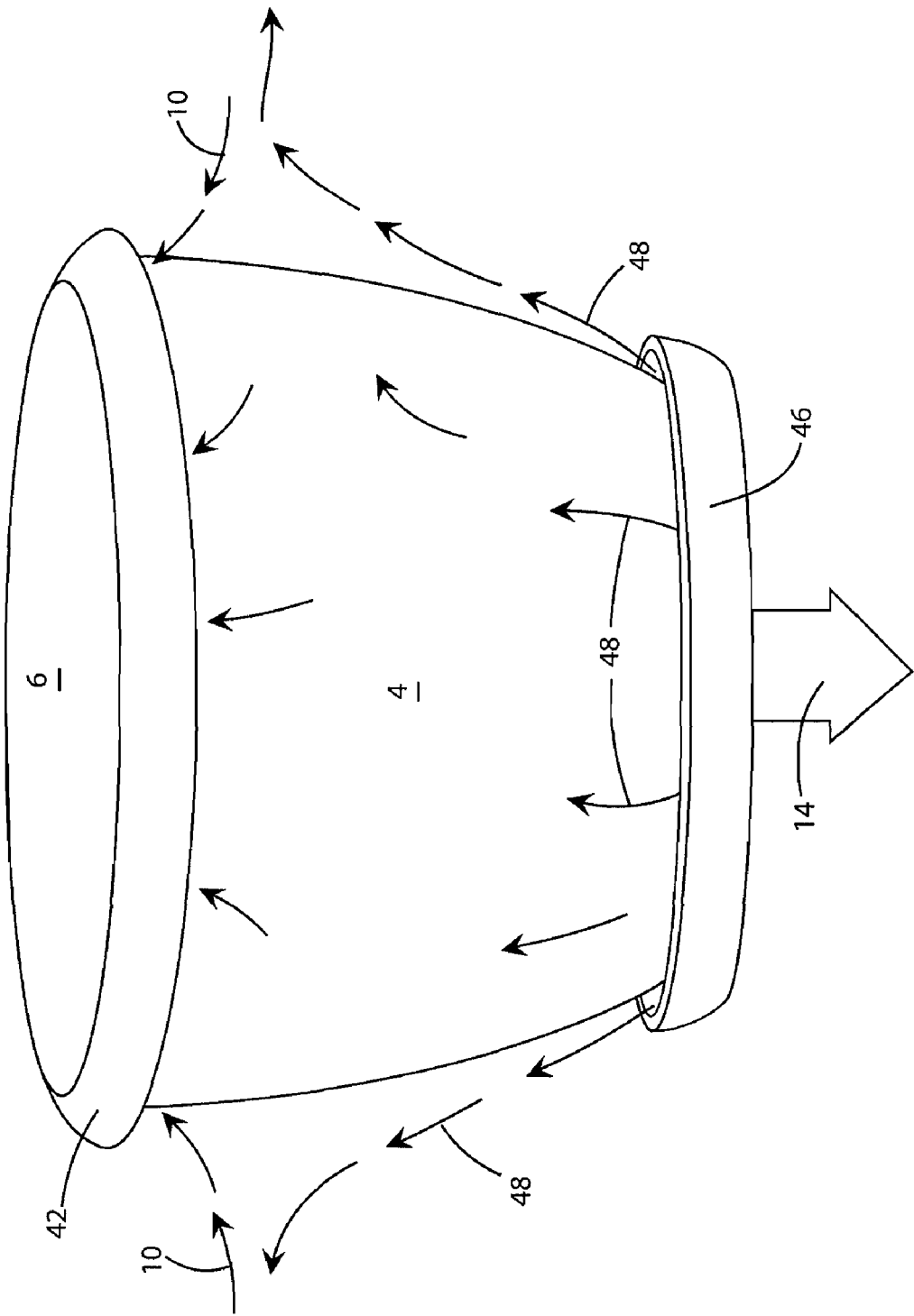
FIG. 2 is a perspective view of the $CO_2$ trap shown in FIG. 1.

FIGS. 1 and 2 show an insect trap 1 incorporating an embodiment of a flow restrictor according to the present invention. The trap 1 includes a housing 2 formed of sidewalls 4 and a top 6. Within housing 2 is a suction device 8. The suction device 8 can be a rotational unit that is driven by a motor or an engine. For example, the suction device 8 can be a blower or a fan. The suction device 8 is shown diagrammatically in FIG. 1 as two rotor blades. The object of suction device 8 is to draw air through the $CO_2$ trap 1 and any known method for doing so can be used.

Intake air 10 is pulled into the trap 1 at the top of the housing by suction device 8. Along with the intake air 10, insects are sucked into the trap. Once within the housing 2, the intake air 10 passes through a catch 12 wherein the insects contained in the air stream are captured. After passing through the suction device 8, or blower, the air is separated for various uses. Much of the air passes directly through trap 1 as waste air 14. A first portion 16 of the intake air 10 is used in the reactor 18 to create $CO_2$. The first portion 16 of air is combined with a combustible fuel 20 in the reactor 18. The combustible fuel 20, which may be a hydrocarbon-based gas, is fed to the trap 1 from a fuel source, such as tank 24. Within the tank 24, the combustible fuel 20 can be, for example, liquid propane or liquefied petroleum gas. The outlet of tank 24 can be directly adjacent the trap, or the combustible fuel 20 may flow to the trap 1 through a conduit, as shown. A regulator is included to reduce the pressure of the combustible fuel from the pressure level maintained in the tank. The pressure of the combustible fuel 20 is then further reduced using the flow restrictor 26 of the invention.

In the reactor 18, the first portion of air 16 is mixed with combustible fuel 20 and oxidized. To initiate the reaction, a spark generator 32 is included in the catalytic reactor 18. The reactants 28 are then fed through a catalyst 30 that is part of reactor 18. The catalyst 30 operates to convert the reactants into $CO_2$ and $H_2O$. The mixture emerging from the catalyst is rich with $CO_2$, and though it also contains nitrogen, water and possibly other products, it will be referred to as $CO_2$. The $CO_2$ 34 leaves the reactor 18 and is swept through exit passage 36 by a second portion of air 38. The second portion of air 38 is propelled by suction device 8 and is able to carry the $CO_2$ out of insect trap 1.

Figure 3:
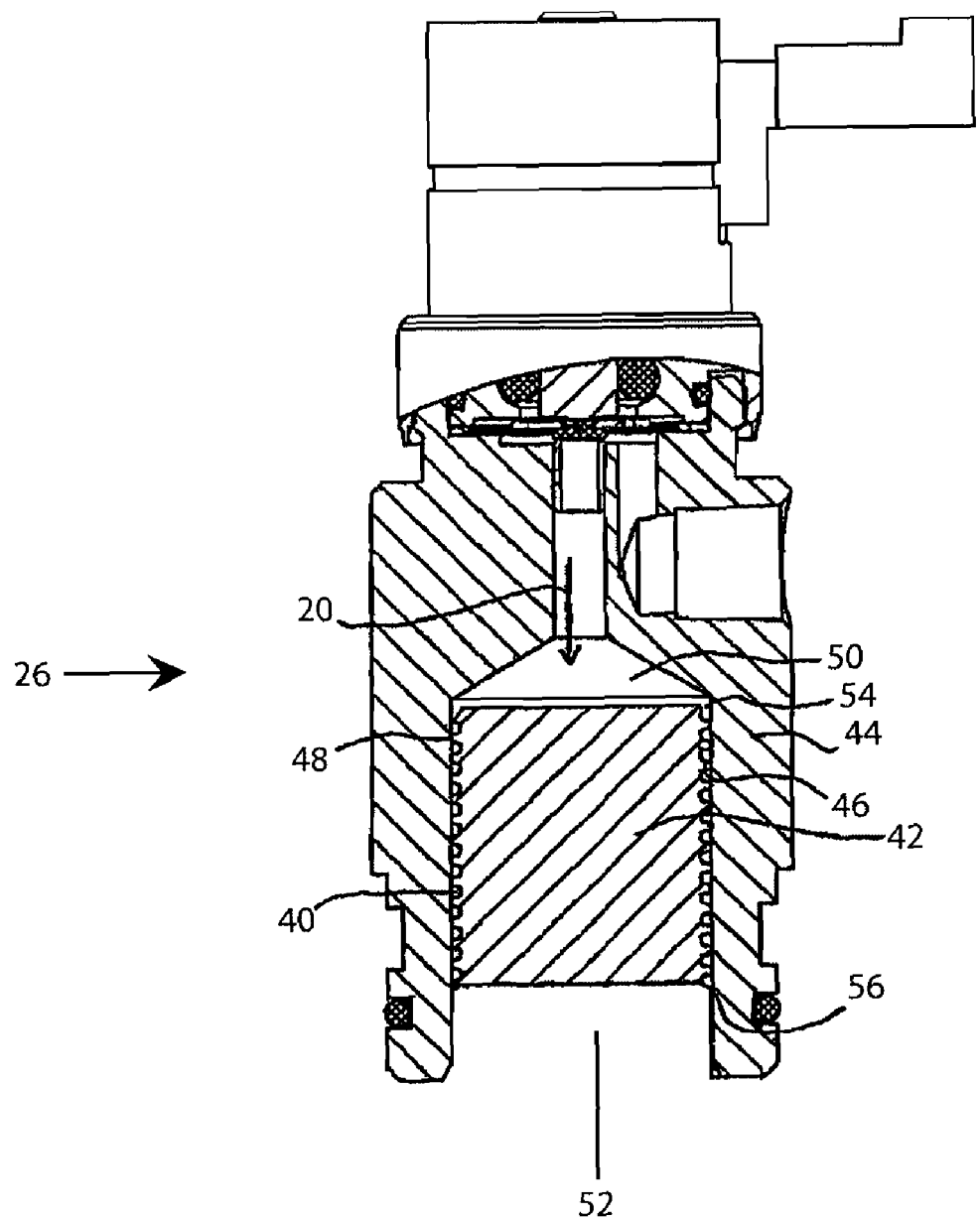
FIG. 3 is a cross sectional view of an embodiment of a flow restrictor according to the present invention.

The flow restrictor 26 of the invention is shown in detail in FIG. 3. The restrictor includes an elongate conduit or capillary 40 with a narrow diameter. Although the capillary 40 has a narrow diameter, it can be more than an order of magnitude larger than the diameter of a conventional orifice used to form the same pressure drop. In one embodiment of the invention, the capillary 40 is free of any abrupt flow disruptions, such as sharp turns or immediate obstructions. Any turns in the capillary may have a large radius of curvature with respect to the capillary diameter. For example, the radius of curvature may be more than three times the diameter of the capillary. For very minute flow disruptions, the radius of curvature of any curves of the capillary can be more than ten times the diameter of the capillary 40.

Although capillary 40 can be a straight conduit, curves in the capillary allow the flow restrictor 26 to be more compact. The curves also provide additional shear stress which aids in the pressure reduction provided by the restrictor 26. In one embodiment, the entire length of the capillary 40 is curved. One example of a continuously curved capillary 40 is a capillary that consistently curves in the same direction for the entire length of the capillary 40.

Figure 4:
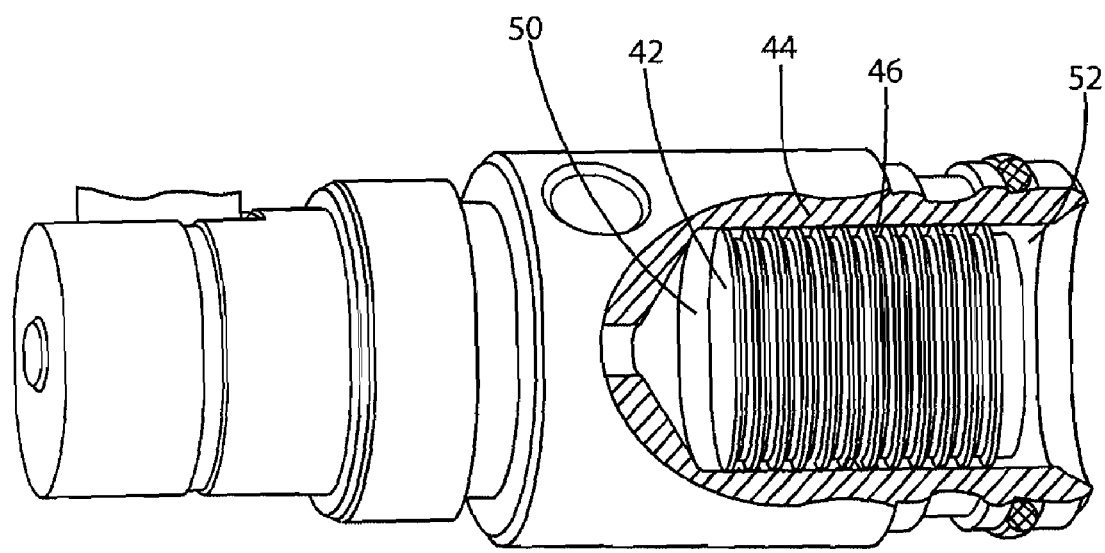
FIG. 4 is a perspective view of the flow restrictor shown in FIG. 3.

The flow restrictor 26 shown in FIGS. 3 and 4 is a particularly low cost embodiment of the invention. The capillary 40 is formed between a plug 42 and a surrounding tube 44, such as a pipe. The combustible fuel 20 is provided to the flow restrictor 26 at an inlet side 50 of the tube. The fuel 20 then flows through the restrictor 26 to an outlet side 52 of the tube. A groove 46 is cut in the outer edge or surface 48 of the plug 42 to thereby provide the capillary 40 in the form of the groove 46 between the plug 42 and the inner surface of the tube 44. Alternatively, the capillary 40 may be provided as a physically separate tube received within the groove 46. The outer edge or surface 48 of the plug 42 and the inner surface of the tube 44 form a seal therebetween. The inlet end 54 of the groove 46 is in communication with the inlet side 50 of the tube and the outlet end 56 of the groove 46 is in communication with the outlet side 52 of the tube. Thus, the only path available from the inlet side 50 to the outlet side 52 is the groove 46 itself. The groove 46 may take any form on the outside of the plug 42. In the illustrated embodiment, the groove 46 is in the form of threading across the entirety of the plug 42. Threading is an advantageous form of the invention, because it provides a continuous, consistent curve in the capillary 40. Thus, there are no abrupt flow disruptions and the capillary 40 may be long in relation to the length of the plug 42, since it is essentially "wound" several times around the plug 42. Further, threading machinery is readily available, and thus, the restrictor can be manufactured at low cost.

In one embodiment, the plug and tube may both be made of metal. To increase the integrity of the seal between the plug 42 and the tube 44, one of these pieces may be formed of a softer metal than the other. For example, the tube may be formed of steel, while the plug is made of brass. Variations of this embodiment may also be made. For instance, the groove 46 can be cut in the tube instead of in the plug 42. Alternatively, portions of the groove 46 can be included in both the plug 42 and the tube 44.

Although the preferred form of the invention has been shown and described, many features may be varied, as will readily be apparent to those skilled in this art.

We claim:

1. An insect lure trap comprising:
   a housing;
   a suction device inside the housing;
   a catch disposed one of inside and proximate the housing;
   a reactor inside the housing; and
   a flow restrictor operable to reduce a pressure of fuel delivered to the reactor, the flow restrictor including,
      a plug having a first end, a second end and an outer surface,
      a tube surrounding the plug and having an inner surface forming a seal with the plug outer surface, and
      at least one of said plug outer surface and said tube inner surface being threaded to form an elongate capillary in the form of a groove having an inlet at the first end of the plug and an outlet at the second end of the plug.

2. The insect lure trap of claim 1 wherein the groove is disposed on the plug.

3. The insect lure trap of claim 2 wherein the groove includes male threading on the plug.

4. The insect lure trap of claim 1 wherein the groove is disposed on the inner surface of the tube.

5. The insect lure trap of claim 4 wherein the groove includes female threading on the inner surface of the tube.

6. The insect lure trap of claim 1 wherein any turn in the elongate capillary has a radius of curvature that is greater than three times a diameter of the elongate capillary.

7. An insect lure trap comprising:
   a housing;
   a suction device inside the housing;
   a catch disposed one of inside and proximate the housing;
   a reactor inside the, housing; and
   a flow restrictor, operable to reduce a pressure of fuel delivered to the reactor, the flow restrictor including,
      an inner member having a first end, a second end and an outer edge,
      an outer member surrounding the inner member and forming a seal with the outer edge,
      a groove adjacent the seal and disposed in at least one of the inner member and the outer member, and
      an elongate capillary disposed in the groove, having an inlet at the first end of the inner member and an outlet at the second end of the inner member and operable to generate pressure drop along an entire length thereof, any turn in the elongate capillary having a radius of curvature that is greater than three times a diameter of the elongate capillary.

* * * * *